J. LEGGET.
Saw-Sets.

No. 155,875.                                 Patented Oct. 13, 1874.

Witnesses                                    Inventor
John L. Borne                                John Legget
C. M. Richardson                             by Dewey & Co
                                             Attys

UNITED STATES PATENT OFFICE.

JOHN LEGGET, OF CARSON CITY, NEVADA.

IMPROVEMENT IN SAW-SETS.

Specification forming part of Letters Patent No. 155,875, dated October 13, 1874; application filed August 12, 1874.

*To all whom it may concern:*

Be it known that I, JOHN LEGGET, of Carson City, Ormsby county, State of Nevada, have invented an Improved Saw-Set; and I do hereby declare the following description and accompanying drawings are sufficient to enable any person skilled in the art or science to which it most nearly appertains to make and use my said invention or improvement without further invention or experiment.

My invention relates to an improved tool or implement for setting saw-teeth, by which four or more teeth can be set by a single stroke of a hammer.

In order to describe my invention, reference is had to the accompanying drawing, forming a part of this specification, in which—

Figure 1:
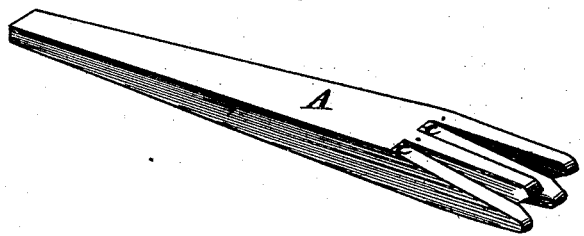
Figure 2:
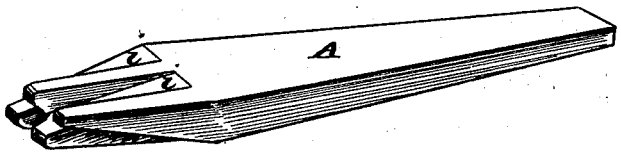
Figure 3:
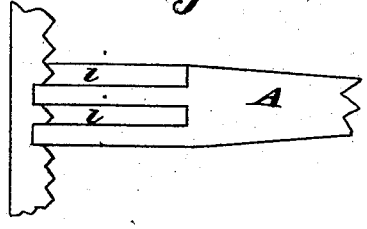

Figures 1 and 2 are perspective views of my saw-set. Fig. 3 is a plan view, showing a saw in position.

A represents a metal bar, steel being preferred. One end of this bar I provide with two or more inclined grooves, $e\,e$, upon one side, which are about as wide as the width of the saw-teeth to be set, leaving a ledge between them of about the same width. Upon the opposite side of the bar I make an equal number of similar grooves, $i\,i$, midway between the grooves $e\,e$, so that the grooves on the two opposite sides of the bar alternate, as shown. The angle or incline of these grooves will be varied according to the greater or less angle to be given to the teeth of the saw. The grooves should be made to overlap each other slightly at the outer end of the bar, so as to give a V-shaped "sight" between the ends of the opposite ledges.

To set a saw, the ledges are straddled over the teeth of the saw, so as to bring a tooth against the inclined face of each incline, and, as the inclines stand alternately in opposite directions, a stroke with a hammer against the opposite end of the bar A will force the teeth alternately in opposite directions, after the manner of setting a saw.

By constructing the implement to set several teeth at a time, the setting may be accomplished with great speed; and, as each incline is the same, the teeth will be accurately set.

Having described my invention, what I claim, and desire to secure by Letters Patent, is—

The tool A, with its oppositely-inclined grooves $e\,e\,i\,i$, arranged to alternate on opposite sides of the tool, substantially as and for the purpose above described.

In witness whereof I hereunto set my hand and seal this 30th day of July, 1874.

JOHN LEGGET. [L. S.]

Witnesses:
ALFRED HELM,
WILLIAM PEARSON.